US012526601B2

(12) United States Patent
Lee et al.

(10) Patent No.: US 12,526,601 B2
(45) Date of Patent: Jan. 13, 2026

(54) AUDIO SIGNAL PROCESSING DEVICE GENERATING ROOM IMPULSE RESPONSE FILTER USING MACHINE LEARNING MODEL

(71) Applicant: GAUDIO LAB, INC., Seoul (KR)

(72) Inventors: Sangmoon Lee, Gyeonggi-do (KR); Kyungyun Lee, Seoul (KR); Jeonghun Seo, Seoul (KR); Sangbae Chon, Seoul (KR); Hyunoh Oh, Gyeonggi-do (KR)

(73) Assignee: GAUDIO LAB, INC., Seoul (KR)

(*) Notice: Subject to any disclaimer, the term of this patent is extended or adjusted under 35 U.S.C. 154(b) by 272 days.

(21) Appl. No.: 18/536,207

(22) Filed: Dec. 11, 2023

(65) Prior Publication Data
US 2024/0196160 A1    Jun. 13, 2024

(30) Foreign Application Priority Data
Dec. 12, 2022    (KR) .......................... 10-2022-0173029

(51) Int. Cl.
*H04S 7/00*    (2006.01)
*G06N 3/08*    (2023.01)
*H04S 3/00*    (2006.01)

(52) U.S. Cl.
CPC .......... *H04S 7/307* (2013.01); *H04S 2400/01* (2013.01)

(58) Field of Classification Search
None
See application file for complete search history.

(56) References Cited

U.S. PATENT DOCUMENTS 10,897,570 B1 *    1/2021    Robinson ............... H04N 23/80
2020/0219528 A1    7/2020    Chowdhary et al.
(Continued)

FOREIGN PATENT DOCUMENTS

EP        3 232 686         10/2017
JP        2002-135170        5/2002
WO    WO-2024089036 A1 *    5/2024    ............... H04S 5/00

OTHER PUBLICATIONS

Notice of Allowance dated Jun. 28, 2025 for Korean Patent Application No. 10-2023-0176279 and its English translation provided by Applicant's foreign counsel.
(Continued)

*Primary Examiner* — Qin Zhu
(74) *Attorney, Agent, or Firm* — WOMBLE BOND DICKINSON (US) LLP

(57) ABSTRACT

Disclosed is an audio signal processing device that estimates a room impulse response (RIR) filter of a space. The audio signal processing device may include a processor. The processor receives an input signal, and estimates, from the received input signal by using a machine learning model, an RIR filter representing a characteristic of a response transferred to a listener from a sound source located in a predetermined location in a space where the input signal is collected, wherein the predetermined location is a relative location determined based on the listener, wherein the machine learning model is trained to estimate a reference RIR filter from signals response associated with a reference RIR filter corresponding to the predetermined location and a plurality of additional RIR filters that represent characteristics of responses transferred to the listener from sound sources located in a space represented by the reference RIR filter.

20 Claims, 6 Drawing Sheets

(56) References Cited

U.S. PATENT DOCUMENTS

2020/0404445 A1\* 12/2020 Amengual Gari ..... H04R 5/033
2022/0159403 A1\* 5/2022 Sporer .................... H04S 7/302
2024/0179487 A1\* 5/2024 Pind ........................ H04S 7/305

OTHER PUBLICATIONS

Lee, Kyungyun et al.: "Room Impulse Response Estimation in a Multiple Source Environment", Audio Engineering Society, Conference Paper 2, Aug. 23-25, 2023, Huddersfield, UK, pp. 1-11.
Office Action dated Dec. 30, 2024 for Korean Patent Application No. 10-2023-0176279 and its English translation provided by Applicant's foreign counsel.

\* cited by examiner

Location corresponding to reference RIR filter

Location corresponding to additional RIR filter

AUDIO SIGNAL PROCESSING DEVICE GENERATING ROOM IMPULSE RESPONSE FILTER USING MACHINE LEARNING MODEL

TECHNICAL FIELD

The present invention relates to an audio signal processing method and device for generating a room impulse response (RIR) filter by using a machine learning model.

BACKGROUND ART

Recently, discussion on AR/MR technologies is being actively undertaken. Conventionally, the sense of vision among five senses has mainly been discussed. In the case that the environment represented by content is reproduced via senses other than the sense of vision, it is highly expected to increase satisfaction of a user. Therefore, research on the spatial audio technology that increases a sense of reality of a virtual reality content is being conducted. Conventionally, the spatial audio technology has focused on reproduction of an accurate location of a sound source such as a multichannel speaker or binaural rendering. Therefore, research on a method of rendering an audio signal to be appropriate for the characteristic of a space where a user is actually located or a space where content is reproduced has not been actively conducted. There is a desire for a method of reproducing reverb that most reflects a spatial characteristic, in order to render an audio signal with a spatial characteristic. Specifically, there is a desire for a method of generating a room impulse response (RIR) that reflects a spatial characteristic, and using the same to generate a sound including a reverb effect of a corresponding space.

DISCLOSURE

Technical Problem

An object of the embodiments of the present invention is to provide an audio signal processing method and device for generating a room impulse response (RIR) filter by using a machine learning model.

Technical Solution

An audio signal processing device that estimates a room impulse response (RIR) filter of a space according to an embodiment of the disclosure may include a processor. The processor may receive an input signal, and may estimate, from the received input signal by using a machine learning model, an RIR filter representing a characteristic of a response transferred to a listener from a sound source located in a predetermined location in a space where the input signal is collected, wherein the predetermined location may be a relative location determined based on the listener. The machine learning model may be trained to estimate a reference RIR filter from response signals associated with a reference RIR filter corresponding to the predetermined location and a plurality of additional RIR filters that represent characteristics of responses transferred to the listener from sound sources located in a space represented by the reference RIR filter. Locations of the sound sources respectively corresponding to the plurality of additional RIR filters are different from each other. In addition, the locations of the sound sources respectively corresponding to the plurality of additional RIR filters may also be different from the predetermined location.

In the process of training the machine learning model, a response provided after a predetermined point in time by the reference RIR filter estimated from the response signals associated with the plurality of additional RIR filters may be estimated by synthesizing a white noise signal. The white noise signal may be a signal of which a signal component ratio of an entire frequency band falls within a predetermined range.

The processor may adjust a response provided after the predetermined point in time in each in a BRIR filter set to a response provided after the predetermined point in time by the estimated reference RIR filter and a response provided after a predetermined point in time by an estimated RIR filter of an additional machine learning model by using the input audio signal as an input, and may perform binaural rendering of a BRIR filter input audio signal via the adjusted BRIR: filter. The additional machine learning model may be trained by replacing the white noise with additional white noise in a method of training the machine learning model. The additional white noise signal may be a signal of which a signal component ratio of an entire frequency band falls within a predetermined range, and may be generated independently from the white noise.

The reference RIR filter and the plurality of additional RIR filters may be normalized to have an identical size.

A signal response of the reference RIR filter and a signal response of the estimated reference RIR filter may be divided as first components and second components.

The machine learning model may be trained based on a first loss function calculated based on a difference between a first component of the reference RIR filter and a first component of the estimated reference RIR filter in the time domain, and a second loss function calculated based on a difference between a second component of the reference RIR filter and a second component of the estimated reference RIR filter in a frequency domain. The first component may be a response provided before a predetermined point in time, and the second component may be a response provided from the predetermined point in time.

The difference between the second component of the reference RIR filter and the second component of the estimated reference RIR filter in the frequency domain may be calculated based on a difference in magnitudes between the second component of the reference RIR filter and the second component of the estimated reference RIR filter in the frequency domain, and a difference in log scale values of magnitudes between the second component of the reference RIR filter and the second component of the estimated reference RIR filter in the frequency domain.

The difference between the first component of the reference RIR filter and the first component of the estimated reference RIR filter in the time domain may be calculated in a unit of a predetermined length of a sample.

A machine learning device for processing a model that estimates a room impulse response (RIR) filter of a space according to an embodiment of the present invention may include a processor. The processor may be trained to estimate a reference RIR filter from response signals associated with a reference RIR filter representing a characteristic of a response transferred to a listener from a sound source located in a predetermined location and a plurality of additional RIR filters representing characteristics of responses transferred to the listener from sound sources located in a space represented by the reference RIR filter.

The predetermined location may be a relative location determined based on the listener. Locations of the sound sources respectively corresponding to the plurality of additional RIR filters are different from each other. In addition, the locations of the sound sources respectively corresponding to the plurality of additional RIR filters may also be different from the predetermined location.

The processor may synthesize a white noise signal, so as to estimate a response provided after a predetermined point in time by the reference RIR filter estimated based on response signals associated with the plurality of additional RIR filters. The white noise signal may be a signal of which a signal component ratio of an entire frequency band falls within a predetermined range.

The reference RIR filter and the plurality of additional RIR filters may be normalized to have an identical size.

The reference RIR filter and the estimated reference RIR filter may be divided as first components and second components. The processor may be trained based on a first loss function calculated based on a difference between a first component of the reference RIR filter and a first component of the estimated reference RIR filter in the time domain, and a second loss function calculated based on a difference between a second component of the reference RIR filter and a second component of the estimated reference RIR filter in the frequency domain. The first component may be a response provided before a predetermined point in time, and the second component may be a response provided from the predetermined point in time.

The processor may perform the calculation based on a difference in magnitudes between the second component of the reference RIR filter and the second component of the estimated reference RIR filter in the frequency domain and a difference in log scale values of magnitudes between the second component of the reference RIR filter and the second component of the estimated reference RIR filter in the frequency domain.

The processor may calculate the difference between the first component of the reference RIR filter and the first component of the estimated reference RIR filter in the time domain in a unit of a predetermined length of a sample.

An operation method of an audio signal processing device that estimates a room impulse response (RIR) filter of a space may include an operation of receiving an input signal, and an operation of estimating, from the received input signal by using a machine learning model, an RIR filter that represents a characteristic of a response transferred to a listener from a sound source located in a predetermined location in a space where the input signal is collected. The predetermined location may be a relative location determined based on the listener. The machine learning model may be trained to estimate a reference RIR filter from response signals associated with a reference RIR filter corresponding to the predetermined location and a plurality of additional RIR filters that represent characteristics of responses transferred to the listener from sound sources located in a space represented by the reference RIR filter. Locations of the sound sources respectively corresponding to the plurality of additional RIR filters are different from each other. In addition, the locations of sound the sources respectively corresponding to the plurality of additional RIR filters may also be different from the predetermined location.

In the process of training the machine learning model, a response provided after a predetermined point in time by the reference RIR filter estimated based on response signals associated with the plurality of additional RIR filters, by synthesizing a white noise signal, wherein the white noise signal may be a signal of which a signal component ratio of an entire frequency band falls within a predetermined range.

The operation method may further include an operation of adjusting a response provided after the predetermined point in time in each in a BRIR filter set to a response provided after the predetermined point in time by the estimated reference RIR filter and a response provided after a predetermined point in time by the estimated RIR filter of an additional machine learning model by using the input audio signal as an input, and an operation of performing binaural rendering of a BRIR filter input audio signal via the adjusted BRIR filter. The additional machine learning model may be trained by replacing the white noise signal with an additional white noise signal in a method of training the machine learning model. The additional white noise signal may be a signal of which a signal component ratio of an entire frequency band falls within a predetermined range, and may be generated independently from the white noise.

The reference RIR filter and the additional RIR filter may be normalized to have an identical size.

An operation method of a machine learning device for generating a model that estimates a room impulse response (RIR) filter of a space according to an embodiment of the disclosure may include an operation of learning to estimate a reference RIR filter from response signals associated with a reference RIR filter representing a characteristic of a response transferred to a listener from a sound source located in a predetermined location and a plurality of additional RIR filters representing characteristics of responses transferred to the listener from sound sources located in a space represented by the reference RIR filter. The predetermined location may be a relative location determined based on the listener. Locations of the sound sources respectively corresponding to the plurality of additional RIR filters are different from each other. In addition, the locations of the sound sources respectively corresponding to the plurality of additional RIR filters may also be different from the predetermined location.

The process of learning to estimate the reference RIR filter may include an operation of synthesizing a white noise signal, so as to estimate a response provided after a predetermined point in time by the reference RIR filter estimated based on response signals associated with the plurality of additional RIR filters. The white noise signal may be a signal of which a signal component ratio of an entire frequency band falls within a predetermined range.

The reference RIR filter and the plurality of additional RIR filters may be normalized to have an identical size.

Effects of the Invention

A method and device according to the embodiments of the present invention provides an audio signal processing method and device for generating a room impulse response (RIR) filter by using a machine learning model.

DETAILED DESCRIPTION OF EMBODIMENTS OF THE INVENTION

Figure 1:
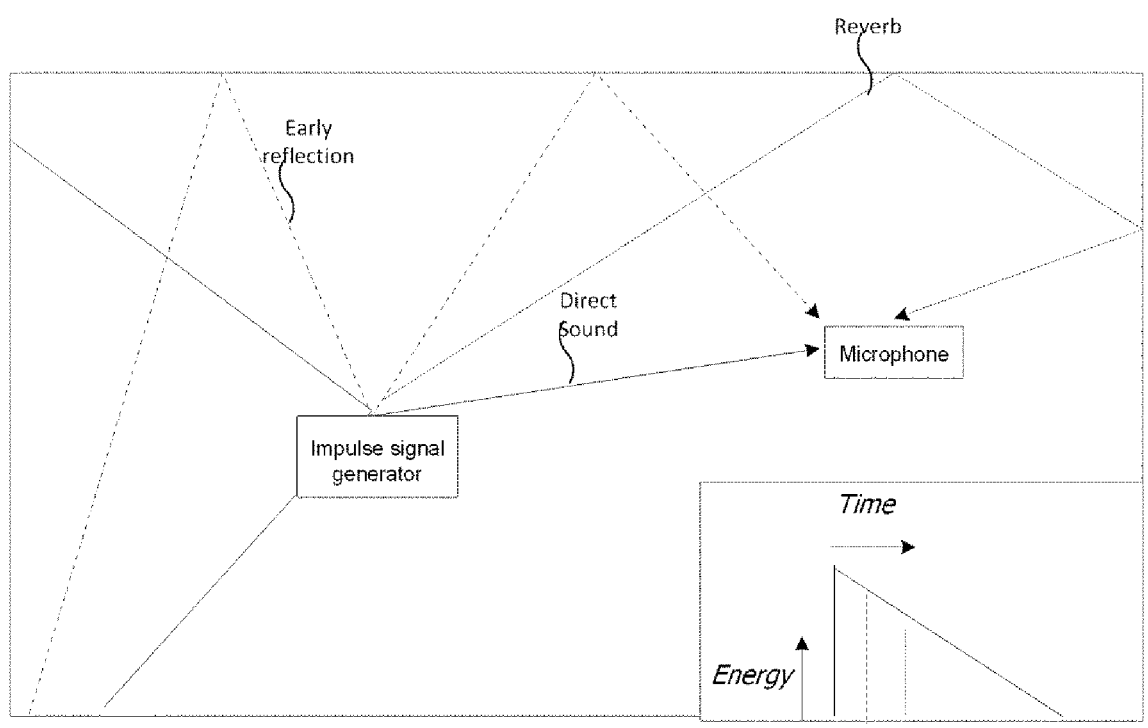
FIG. 1 is a diagram illustrating propagation of an impulse signal in a room.

Hereinafter, embodiments of the present invention will be described in detail with reference to enclosed drawings, so that those skilled in the art could easily implement the embodiments. However, the present invention could be embodied in different manners, and is not limited to the embodiments described below. To clearly describe the present invention, a part that is irrelevant from the description is omitted in the drawing, and a like reference numeral is used for a like component element throughout the specification. When a part "includes" a component element, it does not mean excluding other component elements but it shall be construed that one or more other component elements may be included unless otherwise described.

An audio signal processing device according to an embodiment of the present invention may include at least one processor. An audio signal processing operation described in the present invention may be operation of an instruction set that operates in a processor included in the audio signal processing device.

FIG. 1 is a diagram illustrating propagation of an impulse signal in a room.

An RIR is a signal obtained by measuring how an impulse signal propagates in a space represented by an RIR. In the case that an impulse signal is incurred in a space as shown in FIG. 1, a direct sound that is directly transferred from a sound source and a reflection sound that is reflected from a space and transferred may be generated. In this instance, based on a time of arrival, the reflection sound may be divided as early reflection and reverb. The characteristics of a direct sound, a reflection sound, and reverb generated due to an impulse signal may represent the characteristics of a space. An RIR that is a response of a space with respect to an impulse signal represents the characteristics of the space, and thus a signal that is filtered through an RIR filter may give an impression as if reproduction will be performed in a space represented by the RIR filter. Therefore, a reproduction device may provide an effect as if a sound reproduced using an RIR filter will be reproduced in a real space. The important matter is a method of generating an RIR filter.

Figure 2:
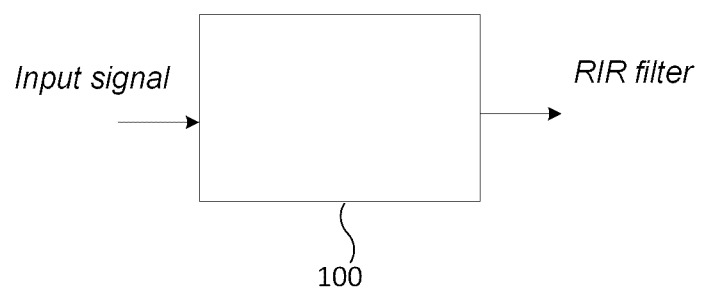
FIG. 2 is a block diagram illustrating an audio signal processing process by an audio signal processing device according to an embodiment of the present invention.

The most intuitive method of generating an RIR filter is to measure an RIR and to generate an RIR filter based on the measured RIR. To measure an RIR, there is a need of a device of generating an impulse signal and equipment for measuring the same. However, a process of measuring or collecting an RIR filter in a real space requires time and cost, and there is a practical restriction. Therefore, a method of collecting, by using a sensor such as a microphone or the like, a response of a space incurred by voice, a noise source, or the like that is actually present in the space, as opposed to an impulse signal, and estimating an RIR filter based on the collected signal. FIG. 2 is a diagram illustrating operation of an audio signal processing device that estimates, using a model, an RIR filter from a signal collected from a space.

FIG. 2 is a block diagram illustrating an audio signal processing process by an audio signal processing device according to an embodiment of the present invention.

An audio signal processing device 100 may receive an input signal collected from a space that an RIR filter is to represent. A processor of the audio signal processing device 100 may use a machine learning model so as to estimate, from an input signal, an RIR filter that represents a space where the input signal is collected. In this instance, the audio signal processing device 100 may estimate an RIR filter that represents a characteristic of a response transferred to a listener from a sound source located in a predetermined location in the space where the input signal is collected. In addition, the predetermined location may be a relative location determined based on the listener. According to a detailed embodiment, the predetermined location may be a location at which the sound source faces the listener and is a predetermined distance away from the front side of the listener. For example, the predetermined location may be a location 1.5 m away from the front side of the listener.

According to a detailed embodiment, the input signal may be a signal collected via a personal acoustic output device such as earphones, a headphone, or the like, or a personal portable device such as a smartphone or the like. According to another detailed embodiment, in the case that the audio signal processing device estimates an RIR filter for imitating a space in a target image, the input signal may be a signal extracted from the target image. In addition, the input signal may be a signal collected during a predetermined time interval or more.

The machine learning model may be a model that is trained to estimate, from an input signal, an RIR filter that represents a space where the input signal is collected. A method of training a model will be described with reference to FIG. 3 to FIG. 5.

According to the above-described embodiments of the present invention, an input signal may be collected from a space that is not controlled, as opposed to a controlled space where only a single impulse signal or sound output from any one sound source is present. Therefore, a machine learning model that is trained to estimate an RIR filter based on an input signal collected from any one sound source, such as the conventional RIR filter estimation models, may be inappropriate for the embodiments of the present invention. In addition, the characteristic of a space that a listener perceives in a sense of hearing may be different depending on relative locations of the listener and a sound source even in a single fixed space. Although the listener is present in the same space, there is a high probability that the characteristic of an estimated RIR filter is changed depending on an uncontrolled change of the location and the direction of a sound source. To overcome the drawback, the machine learning model may estimate an RIR filter corresponding to a predetermined location from an input signal in the state in which sounds output from a plurality of sound sources are present, and may learn a difference from an actual RIR filter at the predetermined location. Through the above, a model may be designed and trained such that the characteristic of an estimated not RIR filter is significantly changed due to an uncontrolled factor in the same space.

Figure 3:
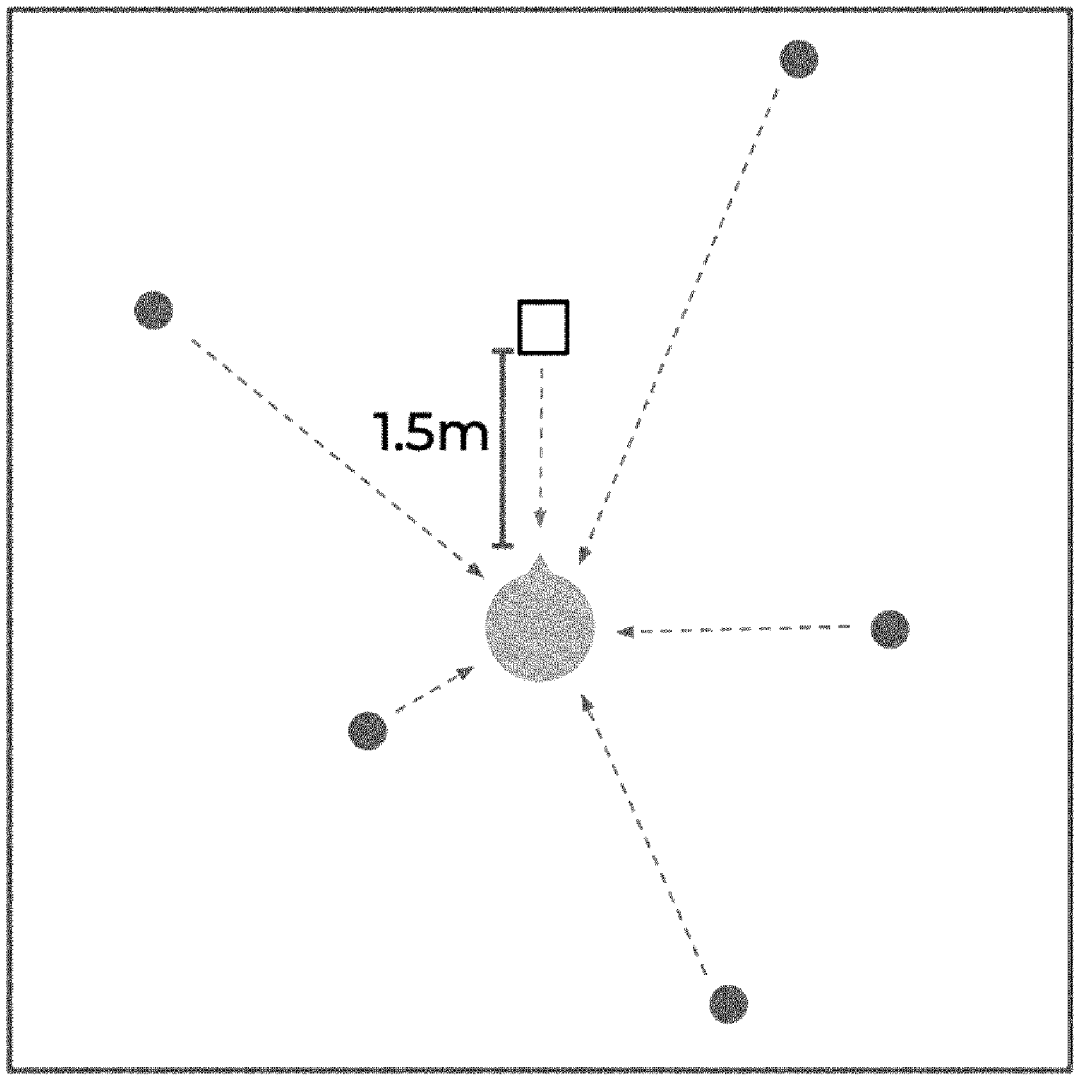
FIG. 3 is a diagram illustrating a location corresponding to a reference RIR and a location corresponding to an additional RIR used for training a machine learning model according to an embodiment of the present invention.
Figure 3:
Figure 3:

FIG. 3 is a diagram illustrating a location corresponding to a reference RIR and a location corresponding to an additional RIR used for training a machine learning model according to an embodiment of the present invention.

The machine learning model may be trained to estimate a reference RIR filter from a signal synthesized by a plurality of additional RIR filters corresponding to the locations of other sound sources and the listener, although they are in the same space as the space represented by the reference RIR filter. The locations of sound sources respectively corresponding to the plurality of additional RIR filters may be different from each other. In addition, the locations of the sound sources respectively corresponding to the plurality of additional RIR filters may also be different from the predetermined location for the reference RIR filter. In addition, the machine learning device may estimate a reference RIR filter from a signal synthesized by the plurality of additional RIR filters, and may be trained to determine a difference between the reference RIR filter and an actual reference RIR filter as a loss.

The machine learning device may randomly select, within a predetermined range, the number of a plurality of additional RIR filters to be used for training one time. In addition, the machine learning device may randomly select, within a predetermined range, the location of a sound source represented by an additional RIR filter used for training performed one time. For example, the machine learning device may randomly select an additional RIR filter to be used for training performed one time from a filter group including a reference RIR filter and a plurality of other RIR filters generated in the corresponding space. According to a detailed embodiment, the filter group may not include a reference RIR filter.

The machine learning device may normalize the sizes of the reference RIR filter and the additional RIR filter to be used for training. Specifically, the machine learning device may apply an additional gain to the reference RIR filter so that the absolute value of a peak amplitude of the reference RIR filter is 0.5. The machine learning device may normalize the entire RIR filter set by applying the gain also to the size of the additional RIR filter generated in the same space.

For estimating a reference RIR filter, the machine learning device may use a white noise signal, in addition to a signal generated by the reference RIR filter and a plurality of additional RIR filters. In this instance, the white noise may be a signal of which a signal component ratio of the entire frequency band falls within a predetermined range. The white noise may evenly include signal components of the entire frequency band. Therefore, the machine learning device may input, to the model, the white noise in addition to an input signal synthesized by the reference RIR filter and the additional RIR filter, so that the machine learning model may estimate the reference RIR filter based on signals of various frequency bands. Specifically, the machine learning device may synthesize a white noise so as to estimate a reverb part of a response of the reference RIR filter when estimating the reference RIR filter from response signals associated with the plurality of additional RIRs. In this instance, the reverb part may be a response provided after a predetermined point in time.

An RIR filter used for training may be an RIR filter measured in advance in an actual space. In addition, an RIR filter used for training may be a filter generated via simulation. By using the filter generated via simulation, the time and cost used for measuring an actual RIR filter may be reduced.

The structure of the machine learning model will be described with reference to FIG. 4, and a loss function that the machine learning device used for training a machine learning model will be described with reference to FIG. 5.

Figure 4:
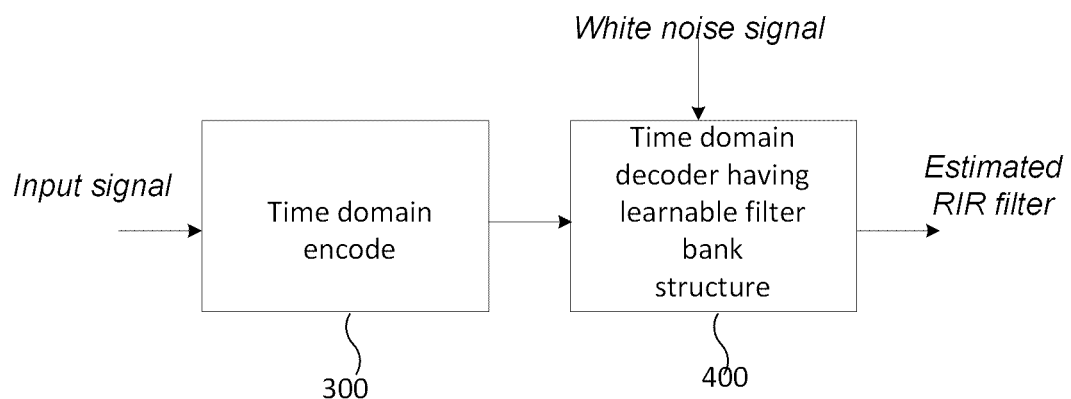
FIG. 4 is a diagram illustrating the structure of a machine learning model according to an embodiment of the present invention.

FIG. 4 is a diagram illustrating the structure of a machine learning model according to an embodiment of the present invention.

A machine learning model according to an embodiment of the present invention may include an encoder 300 defined in the time domain and a decoder 400 that imitates an RIR filter by using the sum of decaying filtered noise signals. The encoder 300 defined in the time domain may identify a reverb pattern that varies over time. A received input signal may be converted into a vector having 128 dimensions and may be output. Output data of the encoder may be transferred to the decoder 400 that is combined with a logic that learns the coefficient of a learnable filter bank. The model may generate and combine a filtered noise signal having, for example, a total of 10 decaying patterns, and may estimate a reference RIR. In this instance, a white noise signal may be additionally input to the model. Through the above, the model may imitate various types of patterns in the time and frequency domain.

Figure 5:
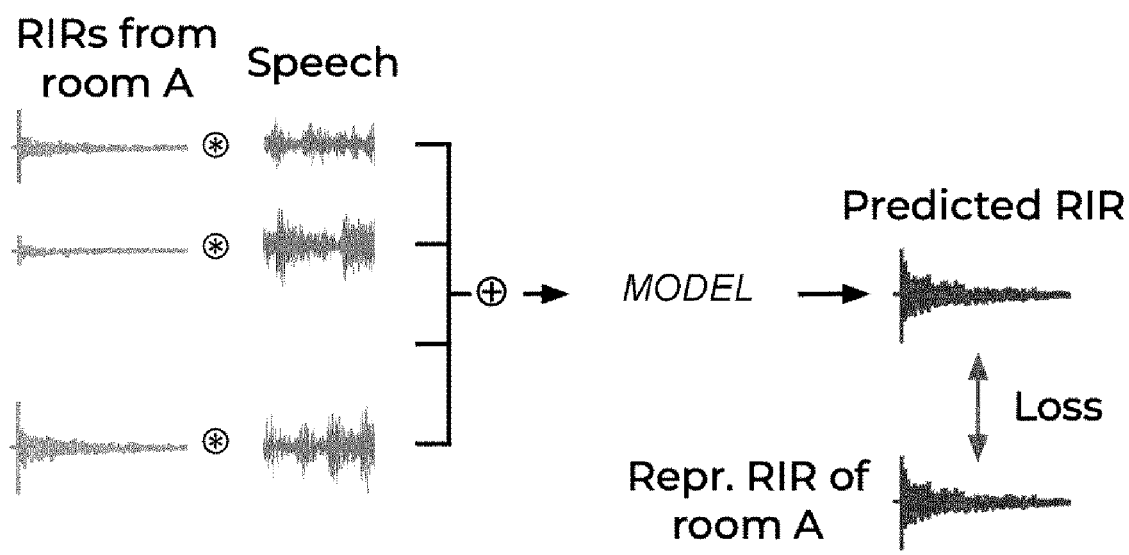
FIG. 5 is a diagram illustrating a process of calculating a loss used for training a machine learning model according to an embodiment of the present invention.

FIG. 5 is a diagram illustrating a process of calculating a loss used for training a machine learning model according to an embodiment of the present invention.

A machine learning device may divide an actual reference RIR filter and an estimated reference RIR filter into a plurality of sections, and may calculate a loss. Specifically, the machine learning device may calculate a loss by distinguishing first components and second components of the actual reference RIR filter and the estimated reference RIR filter. In this instance, a first component may be a response provided before a predetermined point in time and a second component may be a response provided from the predetermined point in time. The machine learning device may obtain a loss by using a first loss function calculated based on the difference between the first component of the actual reference RIR filter and the first component of the estimated reference RIR filter in the time domain. In addition, the machine learning device may obtain a loss by using a second loss function calculated based on the difference between the second component of the actual reference RIR filter and the second component of the estimated reference RIR filter in the frequency domain. A signal response of an RIR filter may be briefly classified as a direct sound and early reflection, and reverb, since the characteristics of the direct sound and early reflection and the characteristics of reverb are different.

According to a detailed embodiment, the machine learning device may calculate the difference between the first component of the actual reference RIR filter and the first component of the estimated reference RIR filter in the time domain in a unit of a predetermined length of a sample.

According to another detailed embodiment, the machine learning device may be trained by applying one of the two loss functions in the entire time domain, irrespective of a predetermined point in time.

Based on the difference in magnitudes between the second component of the actual reference RIR filter and the second component of the estimated reference RIR filter in the frequency domain, the machine learning device may calculate the difference between the second component of the actual reference RIR filter and the second component of the estimated reference RIR filter in the frequency domain. In addition, based on the difference in log scale values of magnitudes between the second component of the actual reference RIR filter and the second component of the estimated reference RIR filter in the frequency domain, the machine learning device may calculate the difference between the second component of the actual reference RIR filter and the second component of the estimated reference RIR filter in the frequency domain. Specifically, the machine learning device may calculate a loss between the estimated reference RIR filter and the actual reference RIR filter by using Equation 1 to Equation 3.

$$L_{sc}(h, \hat{h}) = \frac{\|STFT(h) - STFT(\hat{h})\|_F}{\|STFT(h)\|_F}$$ [Equation 1]

$$L_{mag}(h, \hat{h}) = \frac{1}{N}\|\log(STFT(h)) - \log(STFT(\hat{h}))\|_1$$ [Equation 2]

$$L_{stft} = \sum^{R} L_{sc_r}(h, \hat{h}) + L_{mag_r}(h, \hat{h})$$ [Equation 3]

L_sc is a ratio of a difference in energy between the reference RIR and the actual RIR to the energy of the reference RIR in association with a second component. L_mag is an average value of a difference in the log values the magnitudes of second components between the reference RIR and the actual RIR. The fact that L_mag is defined as a difference in scale log reflects the cognitive characteristic that perceives a difference based on a DB scale as opposed to the cognitive characteristic of a human that linearly perceives a difference in magnitude. In addition, according to a detailed embodiment, the machine learning device may define a final loss function (cost function) by using one or more of L_sc and L_mag in order to measure a second component.

Figure 6:
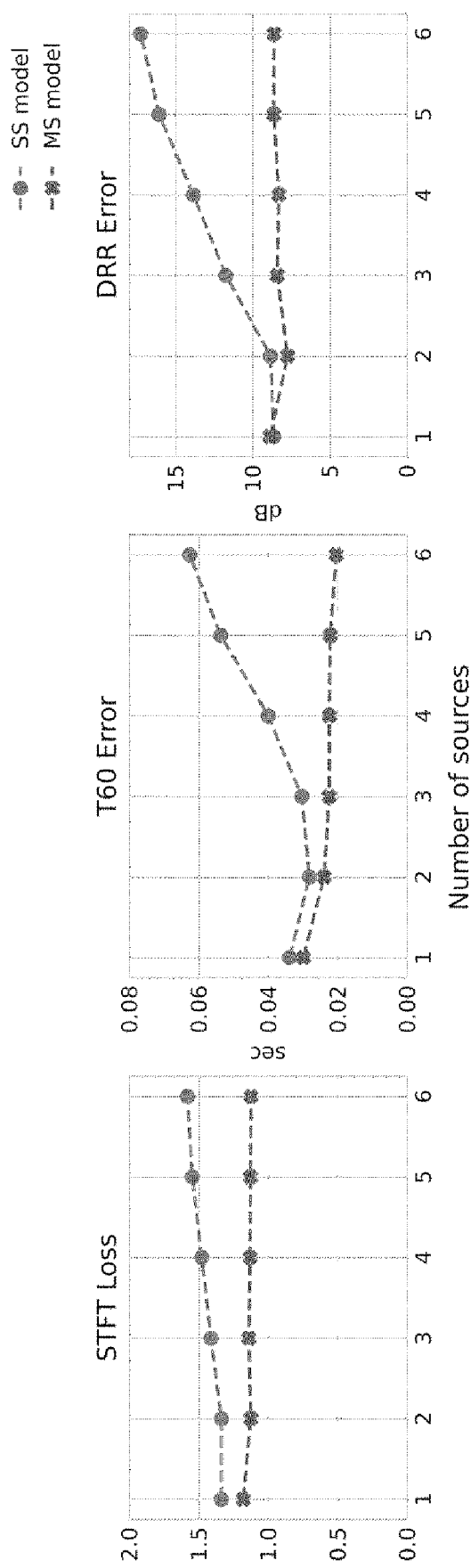
FIG. 6 is a diagram illustrating a difference between an RIR filter estimation performance of a machine learning model according to an embodiment of the present invention and an RIR filter estimation performance of a model different from that of the embodiment of the present invention.

FIG. 6 is a diagram illustrating a difference in an RIR filter estimation performance of a machine learning model according to an embodiment of the present invention and an RIR filter estimation performance of a model different from that of the embodiment of the present invention.

In FIG. 6, SS denotes a model that estimates a reference RIR filter from a signal response generated from a single RIR filter. MS is a learning model according to the above-described embodiments of the present invention, and denotes a model that estimates a reference RIR filter from a signal response of a reference RIR filter and a signal reference of an additional RIR filter. In addition, a direct-to-reverberation ratio (DRR) is a ratio of a direct sound to reverb, and T60 denotes the point in time at which energy of a direct sound-to-reverb signal is decreased by 60 dB. Therefore, according to the number of sound sources used for generating an input signal, the graph of FIG. 6 shows a loss of STFF for each model, a difference in T60 between an actual RIR filter and an RIR filter estimated by each model, and a difference in DRR between an actual RIR filter and an RIR filter estimated by each model.

As described above, in the case of a learning model according to an embodiment of the present invention, the accuracy of a model that estimates a reference RIR filter from a signal response of a reference RIR filter and a signal response of an additional RIR filter may be higher than the accuracy of an existing model that estimates a reference RIR filter from a signal response generated by a single RIR filter. Specifically, as shown in FIG. 6, in the case that the number of sound sources used for generating an input signal is increased, the difference between an RIR filter estimation performance of a machine learning model according to an embodiment of the present invention and an RIR filter estimation performance of a model different from the embodiment of the present invention may be increased.

Figure 7:
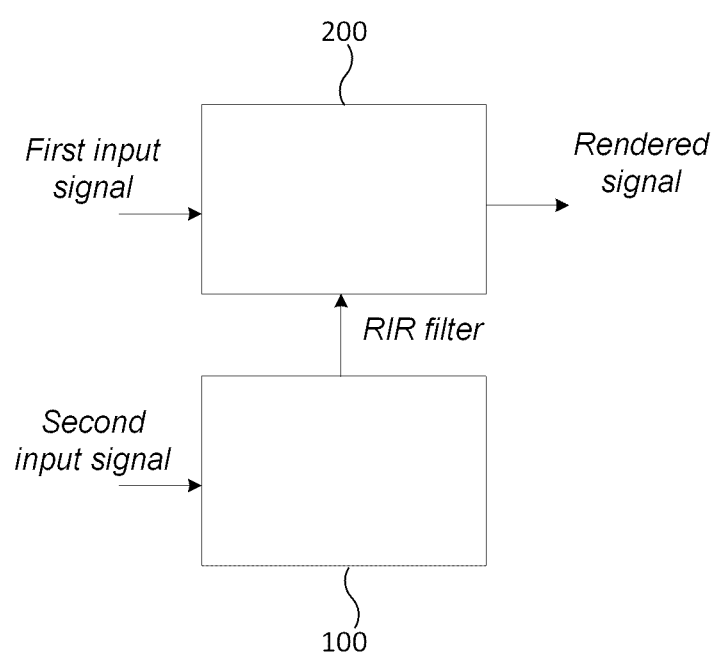
FIG. 7 is a diagram illustrating a method of rendering an audio signal by using an estimated RIR filter according to an embodiment of the present invention.

FIG. 7 is a diagram illustrating a method of rendering an audio signal by using an estimated RIR filter according to an embodiment of the present invention.

An audio signal processing device may include an RIR filter estimation device 100 and a renderer 200. As illustrated in FIG. 2, an RIR filter estimation device may receive a second input signal collected from a space to which simulation is to be performed, and may estimate an RIR filter based on the second input signal. The renderer 200 may perform rendering of a first input signal by using the estimated RIR filter. Specifically, the renderer 200 may adjust, to a component of the estimated RIR filter, a component provided after a predetermined point in time of a signal response component of a filter used for renderer. For example, the renderer 200 may replace, with the component of the estimated filter, the component provided after a predetermined point in time of a signal response component of a filter used for renderer.

The renderer 200 may perform binaural rendering. In this instance, the renderer 200 may adjust a response provided after a predetermined point in time in each in a binaural room impulse response (BRIR) set to a response provided after a predetermined point in time by the estimated reference RIR and a response provided after a predetermined point in time by an estimate RIR of an additional machine learning model by using a second input audio signal as an input. For example, the renderer 200 may perform binaural rendering. In this instance, the renderer 200 may adjust a response provided after a predetermined point in time in each in a binaural room impulse response (BRIR) set to a response provided after a predetermined point in time by the estimated reference RIR and a response provided after a predetermined point in time by an estimate RIR of an additional machine learning model by using a second input audio signal as an input. The renderer 200 may perform binaural rendering of the first input signal via an adjusted BRIR.

The additional machine learning model may be trained by replacing the above-described white noise with an additional white noise in the above-described method of training a machine learning model. The additional white noise may be a signal of which a signal component ratio of the entire frequency band falls within a predetermined range, and may be generated independently from the white noise.

In addition, the renderer 200 may determine whether a space where a listener is located is changed, and in the case that the space where the listener is located is changed, may perform rendering by using a newly estimated RIR filter. Specifically, the renderer 200 may determine whether the space where the listener is located is changed by comparing a parameter of a previously estimated RIR filter and a parameter of a newly estimated RIR filter. In addition, the renderer 200 may determine whether the space where the listener is located is changed by using a location sensor or a magnetic sensor.

In some embodiments, it may be embodied in the form of a recording medium including instructions executable by a computer such as a program module implemented by a computer. A computer readable medium may be an available medium accessible by a computer, and may include all of volatile and nonvolatile media, and removable and unremoveable media. In addition, the computer readable medium may include a computer storage medium. A computer storage medium may include all of a volatile and nonvolatile medium, a removable or non-removable medium embodied by a technology or method for storing information such as computer-readable instructions, data structures, program modules or other data.

Although the present disclosure has been described with reference to detailed embodiments, those skilled in the art field that the present disclosure belongs to may correct or modify the present disclosure without departing from the subject matter and the scope of the present disclosure. That is, although the present disclosure has described an embodiment associated with adjusting a loudness level of an audio signal, the present disclosure may be equally or extendedly applied to various multimedia signals including a video signal in addition to an audio signal. Therefore, it is construed that an idea that those skilled in the art field to which the present disclosure belongs are capable of easily inferring from the detailed descriptions and embodiments of the present disclosure is understood as belonging to the scope of right of the present disclosure.

The invention claimed is:

1. An audio signal processing device that estimates a room impulse response (RIR) filter of a space, the device comprising:
a processor,
wherein the processor is configured to:
receive an input signal; and
estimate, from the received input signal by using a machine learning model, an RIR filter representing a characteristic of a response transferred to a listener from a sound source located in a predetermined location in a space where the input signal is collected, wherein the predetermined location is a relative location determined based on the listener,
wherein the machine learning model is trained to estimate a reference RIR filter from response signals associated with a reference RIR filter corresponding to the predetermined location and a plurality of additional RIR filters that represent characteristics of responses transferred to the listener from sound sources located in a space represented by the reference RIR filter, and
wherein locations of the sound sources respectively corresponding to the plurality of additional RIR filters are different from each other.

2. The device of claim 1, wherein the training of the machine learning model comprises:
synthesizing a white noise signal, so as to estimate a response provided after a predetermined point in time by the reference RIR filter estimated based on response signals associated with the plurality of additional RIR filters,
wherein the white noise signal is a signal of which a signal component ratio of an entire frequency band falls within a predetermined range.

3. The device of claim 2, wherein the processor is configured to:
adjust a response provided after the predetermined point in time in each in a BRIR filter set to a response provided after the predetermined point in time by the estimated reference RIR filter and a response provided after a predetermined point in time by an estimated RIR filter of an additional machine learning model by using the input audio signal as an input; and
perform binaural rendering of a BRIR filter input audio signal via the adjusted BRIR filter,
wherein the additional machine learning model is trained by replacing the white noise signal with an additional white noise signal in a method of training the machine learning model, and wherein the additional white noise signal is a signal of which a signal component ratio of an entire frequency band falls within a predetermined range, and is generated independently from the white noise signal.

4. The device of claim 1, wherein the reference RIR filter and the plurality of additional RIR filters are normalized to have an identical size.

5. The device of claim 1, wherein a signal response of the reference RIR filter and a signal response of the estimated reference RIR filter are divided as first components and second components,
wherein the machine learning model is trained based on a first loss function calculated based on a difference between a first component of the reference RIR filter and a first component of the estimated reference RIR filter in a time domain, and a second loss function calculated based on a difference between a second component of the reference RIR filter and a second component of the estimated reference RIR filter in a frequency domain,
wherein the first component is a response provided before a predetermined point in time, and
wherein the second component is a response provided from the predetermined point in time.

6. The device of claim 5, wherein the difference between the second component of the reference RIR filter and the second component of the estimated reference RIR filter in the frequency domain is calculated based on:
a difference in magnitudes between the second component of the reference RIR filter and the second component of the estimated reference RIR filter in the frequency domain; and
a difference in log scale values of magnitudes between the second component of the reference RIR filter and the second component of the estimated reference RIR filter in the frequency domain.

7. The device of claim 5, wherein the difference between the first component of the reference RIR filter and the first component of the estimated reference RIR filter in the time domain is calculated in a unit of a predetermined length of a sample.

8. A machine learning device for generating a model that estimates a room impulse response (RIR) filter of a space, the device comprising:
a processor,
wherein the processor is trained to estimate a reference RIR filter from response signals associated with a reference RIR filter representing a characteristic of a response transferred to a listener from a sound source located in a predetermined location and a plurality of additional RIR filters representing characteristics of responses transferred to the listener from sound sources located in a space represented by the reference RIR filter,
wherein the predetermined location is a relative location determined based on the listener, and
wherein locations of sound sources respectively corresponding to the plurality of additional RIR filters are different from each other.

9. The device of claim 8, wherein the processor is configured to:
synthesize a white noise signal, so as to estimate a response provided after a predetermined point in time by the reference RIR filter estimated based on response signals associated with the plurality of additional RIR filters, wherein the white noise signal is a signal of which a signal component ratio of an entire frequency band falls within a predetermined range.

10. The device of claim 8, wherein the reference RIR filter and the plurality of additional RIR filters are normalized to have an identical size.

11. The device of claim 8, wherein the reference RIR filter and the estimated reference RIR filter are divided as first components and second components,
   wherein the processor is trained based on a first loss function calculated based on a difference between a first component of the reference RIR filter and a first component of the estimated reference RIR filter in a time domain, and a second loss function calculated based on a difference between a second component of the reference RIR filter and a second component of the estimated reference RIR filter in a frequency domain,
   wherein the first component is a response provided before a predetermined point in time, and
   wherein the second component is a response provided from the predetermined point in time.

12. The device of claim 11, wherein the processor performs the calculation based on:
   a difference in magnitudes between the second component of the reference RIR filter and the second component of the estimated reference RIR filter in the frequency domain; and
   a difference in log scale values of magnitudes between the second component of the reference RIR filter and the second component of the estimated reference RIR filter in the frequency domain.

13. The device of claim 11, wherein the processor is configured to calculate the difference between the first component of the reference RIR filter and the first component of the estimated reference RIR filter in the time domain in a unit of a predetermined length of a sample.

14. An operation method of an audio signal processing device that estimates a room impulse response (RIR) filter of a space, the method comprising:
   receiving an input signal; and
   estimating, from the received input signal by using a machine learning model, an RIR filter that represents a characteristic of a response transferred to a listener from a sound source located in a predetermined location in a space where the input signal is collected,
   wherein the predetermined location is a relative location determined based on the listener,
   wherein the machine learning model is trained to estimate a reference RIR filter from response signals associated with a reference RIR filter corresponding to the predetermined location and a plurality of additional RIR filters that represent characteristics of responses transferred to the listener from sound sources located in a space represented by the reference RIR filter, and
   wherein locations of the sound sources respectively corresponding to the plurality of additional RIR filters are different from each other.

15. The method of claim 14, wherein the training of the machine learning model comprises:
   synthesizing a white noise signal, so as to estimate a response provided after a predetermined point in time by the reference RIR filter estimated based on response signals associated with the plurality of additional RIR filters,
   wherein the white noise signal is a signal of which a signal component ratio of an entire frequency band falls within a predetermined range.

16. The method of claim 15, further comprising:
   adjusting a response provided after the predetermined point in time in each in a BRIR filter set to a response provided after the predetermined point in time by the estimated reference RIR filter and a response provided after a predetermined point in time by the estimated RIR filter of an additional machine learning model by using the input audio signal as an input; and
   performing binaural rendering of a BRIR filter input audio signal via the adjusted BRIR filter,
   wherein the additional machine learning model is trained by replacing the white noise signal with an additional white noise signal in a method of training the machine learning model, and
   wherein the additional white noise signal is a signal of which a signal component ratio of an entire frequency band falls within a predetermined range, and is generated independently from the white noise.

17. The method of claim 14, wherein the reference RIR filter and the additional RIR filter are normalized to have an identical size.

18. An operation method of a machine learning device for generating a model that estimates a room impulse response (RIR) filter of a space, the method comprising:
   learning to estimate a reference RIR filter from response signals associated with a reference RIR filter representing a characteristic of a response transferred to a listener from a sound source located in a predetermined location and a plurality of additional RIR filters representing characteristics of responses transferred to the listener from sound sources located in a space represented by the reference RIR filter;
   wherein the predetermined location is a relative location determined based on the listener, and
   wherein the locations of sound sources respectively corresponding to the plurality of additional RIR filters are different from each other.

19. The method of claim 18, wherein the learning of estimating the reference RIR filter comprises:
   synthesizing a white noise signal, so as to estimate a response provided after a predetermined point in time by the reference RIR filter estimated based on response signals associated with the plurality of additional RIR filters,
   wherein the white noise signal is a signal of which a signal component ratio of an entire frequency band falls within a predetermined range.

20. The method of claim 18, wherein the reference RIR filter and the plurality of additional RIR filters are normalized to have an identical size.

* * * * *